United States Patent Office

3,505,388
Patented Apr. 7, 1970

3,505,388
10,11-DIHYDRO-5,10-METHANODIBENZO-CYCLOHEPTENES
Marcia E. Christy, Perkasie, Pa., assignor to Merck & Co., Inc., Rahway, N.J., a corporation of New Jersey
No Drawing. Filed Mar. 21, 1967, Ser. No. 624,705
Int. Cl. C07c 63/44, 69/76, 69/78
U.S. Cl. 260—469                           3 Claims

ABSTRACT OF THE DISCLOSURE

The 1-(10,11-dihydro - 5,10 - methano - 5H - dibenzo [a,d]cyclohepten-5-yl) - 3 - dimethylamino - 1 - propanol as well as the corresponding dimethylamino-1-propene dehydration product and the dimethylaminopropane hydrogenation product (compounds active as antidepressants) are all produced from 9-alkanoyl-anthracene by first reacting the anthracene with an acrylic ester to produce the 9,10-ethano-11-carbalkoxy - 9,10 - dihydroanthracene, conversion to the corresponding carboxylic acid hydrazide, followed by degradation to the corresponding 11-amino compound and acidic rearrangement to produce 5-alkanoyl - 5,10 - methano-11-hydroxy-10,11-dihydrodibenzocycloheptene, followed by conversion of the 5-position side chain to a dialkylamino-1-propanol substituent.

This invention relates to 10,11-dihydro-5,10-methano derivatives of dibenzocycloheptenes having the 5-position substituted by an organic radical and, particularly, the invention relates to 10,11-dihydro-5,10-methanodibenzocycloheptenes having a saturated or unsaturated alkyl substituent or a saturated or unsaturated substituted-alkyl substituent attached to the 5-position.

The invention includes 10,11-dihydro-5,10-methanodibenzocycloheptenes having a 5-position aminoalkyl side chain optionally further substituted by ketonic oxygen, hydroxyl and, in addition, is saturated or unsaturated.

The invention also includes 5-alkanoyl-10,11-dihydro-5H-dibenzo[a,d]cycloheptene compounds which are intermediates in the preparation of the biologically-active compounds of my invention.

The invention also relates to methods of preparing 5-aminoalkyl-10,11-dihydro - 5,10 - methanodibenzocycloheptene compounds and to intermediates in the preparation of said compounds from 9-alkanoyl, e.g., 9-acetylanthracene compounds such as 9-alkanoyl-9,10-dihydro-9,10-ethano-11-(carboxy or carbalkoxy)anthracene compounds, 5-alkanoyl - 10,11 - dihydro - 5,10 - methano-11-(acyloxy or hydroxy)dibenzocycloheptene compounds.

The new compounds representative of my invention are 5,10-methano - 10,11 - dihydrodibenzocycloheptene compounds which contain alkyl, alkanoyl or alkanoyloxy substituents at the 5-position of the dibenzocycloheptene molecule. Representative groups of compounds included within the scope of my invention are those in which the 5-alkyl substituent is substituted at any of the carbon atoms of the side chain with a primary amine, a secondary amine, or a tertiary amine substituent, particularly, N-alkylated secondary or tertiary amine groups wherein the N-alkyl radicals are methyl, ethyl, propyl, isopropyl, butyl, secondary butyl, isobutyl and t-butyl substituents.

There are also included tertiary aminoalkyl-substituted compounds in which the tertiary amine nitrogen is linked in a heterocyclic ring containing 5 or 6 members which optionally contains additional hetero atoms such as nitrogen, oxygen or sulphur linked with the requisite number of carbons to complete the 5- or 6-membered heterocyclic ring.

Also included within the scope of my invention are compounds which contain additional functional substituents attached to any of the carbons of the alkyl side chain. These substituents include hydroxyl, ketonic oxygen, acyloxy (particularly alkanoyloxy), halo and/or amino (primary, secondary or tertiary amino including heterocyclic amino of the type mentioned hereinabove).

The compounds of my invention include 5-alkyl or substituted-alkyl 5,10-methano - 10,11 - dihydrodibenzocycloheptene compounds wherein the 5-alkyl or substituted-alkyl radicals include both saturated and unsaturated derivatives including 5-methyl, ethyl, propyl, isopropyl, butyl, branched-chain butyl such as isobutyl, secondary butyl and t-butyl as well as pentyl and hexyl, and the corresponding unsaturated derivatives such as 5-vinyl, propenyl, isopropenyl, butenyl, pentenyl and hexenyl 5,10-methano - 10,11 - dihydrodibenzocycloheptenes, especially including those compounds wherein the double bond of the unsaturated side chain at the 5-position is attached to the carbon linking the unsaturated side chain to the dibenzocycloheptene nucleus, e.g., 5-(1-propenyl)-5,10-methano-10,11-dihydrodibenzocycloheptene.

Especially preferred compounds of my invention are 5-substituted 5,10-methano - 10,11 - dihydrodibenzocycloheptene compounds wherein the substituent attached to the 5-position is an aminoalkyl substituent, an alkylaminoalkyl substituent, a dialkylaminoalkyl substituent or a heterocyclicaminoalkyl substituent. Such compounds include 5-(aminoalkyl) - 5,10 - methano-10,11-dihydrodibenzocycloheptene, 5-(N-alkylaminoalkyl) - 5,10 - methano-10,11-dihydrodibenzocycloheptene, 5 - (N,N-dialkylaminoalkyl)-5,10-methano - 10,11 - dihydrodibenzocycloheptene, and 5-(heterocyclicaminoalkyl) - 5,10 - methano-10,11-dihydrodibenzocycloheptene. The alkyl side chain through which the aminoalkylamino or heterocyclic amino substituent is linked to the dibenzocycloheptene nucleus at the 5-position is optionally a straight or branched-chain alkyl substituent, preferably of from 1 to 6 carbon atoms as, for example, methyl, ethyl, propyl, isopropyl, butyl or branched-chain butyl, pentyl or hexyl or branched-chain pentyl or hexyl radicals.

In addition to the above-mentioned 5,10-methanodibenzocycloheptene compounds, the intermediate 9,10-ethano-9,10-dihydroanthracene compounds form part of my invention. These intermediate compounds are prepared by heating a 9-alkanoylanthracene compound with acrylic acid or a functionally equivalent derivative thereof such as an acrylic acid ester, acrylonitrile, or the like, to produce the desired 9-alkanoyl-9,10-ethano-9,10-dihydro-anthracene-11-carboxylic acid (alkyl carboxylate or nitrile).

The new compounds of my invention, including the intermediate compounds as well as the pharmaceutically-active end products, also include substituents at the 11-position. The substituents are selected from the group consisting of H, OH, OY, =NOR°, =NOY, NH₂, NHSO₂R,

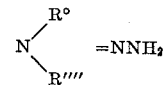

and, in the case wherein the substituent is OH or OY, there can be an alkyl group as defined by R''' replacing the hydrogen at the 11-position; wherein R is lower alkyl, straight or branched-chain, preferably having up to 6 carbon atoms,

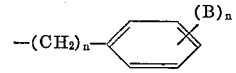

wherein B is hydrogen, halogen, trifluoromethyl, lower alkyl, straight or branched-chain, preferably having up to 4 carbon atoms, lower alkoxy, straight or branched-chain, preferably having up to 4 carbon atoms, and n represents a whole number of from 0 to 3; R° is hydrogen or lower alkyl, straight or branched-chain, preferably having up to 6 carbon atoms; R''' is lower alkyl, straight or branched chain, preferably having up to 6 carbon atoms; Y is alkanoyl, straight or branched-chain, preferably having up to 18 carbon atoms and may contain unsaturation,

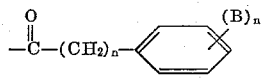

wherein B and *n* are as defined above.

Representative compounds encompassed within the scope of the present invention include:

10,11-dihydro-5,10-methano-11-hydroxy-5-[3-(1-piperidyl)-propyl]-5H-dibenzo[a,d]cycloheptene,
10,11-dihydro-5,10-methano-11-hydroxy-5-[3-(1-methyl-4-piperazinyl)-propyl]5H-dibenzo[a,d]cycloheptene,
10,11-dihydro-5,10-methano-11-hydroxy-5-(3-dimethylaminopropyl)-5H-dibenzo[a,d]cycloheptene,
10,11-dihydro-5,10-methano-11-hydroxy-5-(3-methylaminopropyl)-5H-dibenzo[a,d]cycloheptene,
7-chloro-10,11-dihydro-5,10-methano-11-hydroxy-5-(3-dimethylaminopropyl)-5H-dibenzo[a,d]cycloheptene,
10,11-dihydro-5-(3-dimethylaminopropyl)-5,10-methano-11-hydroxyimino-3-methylsulfonyl-5H-dibenzo[a,d]cycloheptene,
11-methylamino-10,11-dihydro-5-(3-dimethylaminopropyl)-5,10-methano-5H-dibenzo[a,d]cycloheptene,
11-diethylamino-10,11-dihydro-5-(3-dimethylaminopropyl)-5-10-methano-5H-dibenzo[a,d]cycloheptene,
10,11-dihydro-5-(3-dimethylaminopropyl)-5,10-methano-11-ethyl-11-hydroxy-5H-dibenzo[a,d]cycloheptene,
10,11-dihydro-5,10-methano-11-hydroxy-5-(3-methylaminopropyl)-3-methylsulfonyl-5H-dibenzo[a,d]cycloheptene,
10,11-dihydro-5,10-methano-11-hydroxy-5-(3-dimethylaminopropyl)-3-trifluoromethyl-5H-dibenzo[a,d]cycloheptene,
10,11-dihydro-5,10-methano-11-hydroxy-5-(3-diethylaminopropyl)-3-dimethylsulfamoyl-5H-dibenzo[a,d]cycloheptene,
10,11-dihydro-5,10-methano-5-(3-dimethylaminopropyl)-5H-dibenzo[a,d]cycloheptene,
10,11-dihydro-5,10-methano-5-(3-methylaminopropyl)-5H-dibenzo-[a,d]cycloheptene,
10,11-dihydro-5,10-methano-5-(3-methylaminopropyl)-3-methylsulphonyl-5H-dibenzo[a,d]cycloheptene,
10,11-dihydro-5,10-methano-5-(3-dimethylaminopropyl)-3-trifluoromethyl-5H-dibenzo[a,d]cycloheptene,
10,11-dihydro-5,10-methano-5-(3-diethylaminopropyl)-3-dimethylsulfamoyl-5H-dibenzo[a,d]cycloheptene,
11-acetoxy-10,11-dihydro-5,10-methano-5-(3-methylaminopropyl)-3-trifluoromethyl-5H-dibenzo[a,d]cycloheptene,
11-benzoyloxy-10,11-dihydro-5,10-methano-5-(3-methylaminopropyl)-5H-dibenzo[a,d]cycloheptene,
11-p-chlorobenzoyloxy-10,11-dihydro-5-(3-dimethylaminopropyl)-5,10-methano-5H-dibenzo[a,d]cycloheptene,
10,11-dihydro-5-(3-dimethylaminopropyl)-5,10-methano-11-p-tosyloxy-5H-dibenzo[a,d]cycloheptene,
10,11-dihydro-5-(3-dimethylaminopropyl)-5,10-methano-11-p-methoxybenzoyloxy-5H-dibenzo[a,d]cycloheptene,
10,11-dihydro-5-(3-dimethylaminopropyl)-5,10-methano-11-m-trifluoromethylbenzoyloxy-5H-dibenzo[a,d]cycloheptene,
10,11-dihydro-5,10-methano-5-(3-methylaminopropyl)-11-phenylacetoxy-5H-dibenzo[a,d]cycloheptene,
10,11-dihydro-5-(3-dimethylaminopropyl)-5,10-methano-11-hydrocinnamoyloxy-5H-dibenzo[a,d]cycloheptene,
10,11-dihydro-5,10-methano-5-(3-methylaminopropyl)-11-propionyloxy-5H-dibenzo[a,d]cycloheptene,
11-acetoxyimino-10,11-dihydro-5-(3-dimethylaminopropyl)-3-dimethylsulfamoyl-5,10-methano-5H-dibenzo[a,d]cycloheptene,
11-benzoyloxyimino-10,11-dihydro-5,10-methano-5-(3-methylaminopropyl)-5H-dibenzo[a,d]cycloheptene,
10,11-dihydro-5-(3-dimethylaminopropyl)-5,10-methano-11-phenylacetoxyimino-5H-dibenzo[a,d]cycloheptene,
11-p-chlorobenzoyloxyimino-10,11-dihydro-5-(3-dimethylaminopropyl)-5,10-methano-5H-dibenzo[a,d]cycloheptene,
10,11-dihydro-5-(3-dimethylaminopropyl)-5,10-methano-11-p-tosyloxyimino-5H-dibenzo[a,d]cycloheptene,
10,11-dihydro-5-(3-dimethylaminopropyl)-5,10-methano-11-phenylacetoxyimino-5H-dibenzo[a,d]cycloheptene,
10,11-dihydro-5-(3-dimethylaminopropyl)-5,10-methano-11-hydrocinnamoyloxyimino-5H-dibenzo[a,d]cycloheptene,
10,11-dihydro-5-(3-dimethylaminopropyl)-5,10-methano-11-propoxyimino-5H-dibenzo[a,d]cycloheptene,
11-benzenesulfonamido-10,11-dihydro-5-(3-dimethylaminopropyl)-5,10-methano-5H-dibenzo[a,d]cycloheptene,
10,11-dihydro-5-(3-dimethylaminopropyl)-5,10-methano-11-p-toluenesulfonamido-5H-dibenzo[a,d]cycloheptene,
10,11-dihydro-5-(3-dimethylaminopropyl)-5,10-methano-11-phenylmethanesulfonamido-5H-dibenzo[a,d]cycloheptene,
10,11-dihydro-5-(3-dimethylaminopropyl)-5,10-methano-5H-dibenzo[a,d]cycloheptene-N-oxide,
10,11-dihydro-11-dimethylamino-5,10-methano-5-(3-dimethylaminopropyl)-5H-dibenzo[a,d]cycloheptene-N,N'-dioxide,
2-methoxy-10,11-dihydro-5,10-methano-11-hydroxy-5-(3-dimethylaminopropyl)-5H-dibenzo[a,d]cycloheptene,
4-ethoxy-7-trifluoromethyl-10,11-dihydro-5,10-methano-11-hydroxy-5-(3-dimethylaminopropyl)-5H-dibenzo[a,d]cycloheptene,
10,11-dihydro-5-(3-dimethylaminopropyl)-5,10-methano-11-hydroxyimino-2-methoxy-5H-dibenzo[a,d]cycloheptene,
10,11-dihydro-5-(3-dimethylaminopropyl)-5,10-methano-11-hydroxyimino-4-ethoxy-7-trifluoromethyl-5H-dibenzo[a,d]cycloheptene,
10,11-dihydro-5,10-methano-11-hydroxy-5-(3-methylaminopropyl)-2-methoxy-5H-dibenzo[a,d]cycloheptene,
10,11-dihydro-5,10-methano-11-hydroxy-5-(3-methylaminopropyl)-4-ethoxy-7-trifluoromethyl-5H-dibenzo[a,d]cycloheptene,
10,11-dihydro-5,10-methano-11-hydroxy-5-(3-dimethylaminopropyl)-2-methoxy-5H-dibenzo[a,d]cycloheptene,
10,11-dihydro-5,10-methano-11-hydroxy-5-(3-dimethylaminopropyl)-4-ethoxy-7-trifluoromethyl-5H-dibenzo[a,d]cycloheptene,
10,11-dihydro-5,10-methano-11-hydroxy-5-(3-diethylaminopropyl)-2-methoxy-5H-dibenzo[a,d]cycloheptene,
10,11-dihydro-5,10-methano-11-hydroxy-5-(3-diethylaminopropyl)-4-ethoxy-7-trifluoromethyl-5H-dibenzo[a,d]cycloheptene,
10,11-dihydro-5,10-methano-5-(3-methylaminopropyl)-2-methoxy-5H-dibenzo[a,d]cycloheptene,
10,11-dihydro-5,10-methano-5-(3-methylaminopropyl)-4-ethoxy-7-trifluoromethyl-5H-dibenzo[a,d]cycloheptene,
10,11-dihydro-5,10-methano-5-(3-dimethylaminopropyl)-2-methoxy-5H-dibenzo[a,d]cycloheptene,
10,11-dihydro-5,10-methano-5-(3-dimethylaminopropyl)-4-ethoxy-7-trifluoromethyl-5H-dibenzo[a,d]cycloheptene,
10,11-dihydro-5,10-methano-5-(3-diethylaminopropyl)-2-methoxy-5H-dibenzo[a,d]cycloheptene,
10,11-dihydro-5,10-methano-5-(3-diethylaminopropyl)-4-ethoxy-7-trifluoromethyl-5H-dibenzo[a,d]cycloheptene, 11-acetoxy-10,11-dihydro-5,10-methano-5-(3-methyl-
  aminopropyl)-2-methoxy-5H-dibenzo[a,d]cyclo-
  heptene,
11-acetoxy-10,11-dihydro-5,10-methano-5-(3-methyl-
  aminopropyl)-4-ethoxy-7-trifluoromethyl-5-H-dibenzo
  [a,d]cycloheptene,
11-benzoyloxy-10,11-dihydro-5,10-methano-2-methoxy-
  5-(3-methylaminopropyl)-5H-dibenzo[a,d]cyclo-
  heptene.
11-benzoyloxy-10,11-dihydro-5,10-methano-4-ethoxy-7-
  trifluoromethyl-5-(3-methylaminopropyl)-5H-dibenzo
  [a,d]cycloheptene.

The new compounds of my invention possess valuable pharmacological properties which may be exhibited by tests on animals. Thus, these new compounds of my invention have an action on the central nervous system of the intact animal which reverses the effect of certain depressants. Such compounds are useful in pharmaceutical applications as antidepressants.

In addition, the new compounds can be used as starting materitals or as intermediate products in the manufacture of other valuable compounds. For example, the amines form water-insoluble salts with penicillin G and thus can be utilized in the precipitation and recovery of penicillin G or other valuable organic acids.

The compounds which are especially useful are compounds which are represented by the general formula:

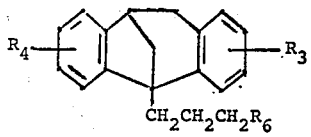

in which:

$R_3$ and $R_4$ represent an alkyl, an alkoxy, a halo, a trifluoromethyl, an alkylsulfonyl or an alkylsulfamoyl substituent; and in which
$R_6$ represents an amino or an aminoalkyl substituent.

In these preferred compounds of my invention, the $R_6$ substituent may be a free amino group, but it is preferably a monoalkylamino, i.e., methylamino, ethylamino propylamino, isopropylamino or butylamino, or a dialkylamino substituent such as diethylamino, dimethylamino, dipropylamino, dibutylamino, or diisopropylamino. In addition, the amino substituent may form a heterocyclic ring having, together with carbon, nitrogen or oxygen, from about 5 to 6 atoms in the rings, including such heterocyclic radicals as N-loweralkylpyrrolidinyl, 1-pyrrolidyl, N-loweralkylpiperidinyl, N-loweralkylpiperylidene - 4 - morpholinyl and 1 - loweralkyl-4-piperizinyl. Especially effective compounds representative of the active compounds of my invention are:

1-(10-11-dihydro-5,10-methano-5H-dibenzo[a,d]cyclo-
  heptene-5-yl)-3-dimethylamino-1-propanol;
1-(10,11-dihydro-5,10-methano-5H-dibenzo[a,d]cyclo-
  heptene-5-yl)-3-dimethylamino-1-propanone;
5-(3-dimethylamino-1-propenyl)-10,11-dihydro-5,10-
  methano-5H-dibenzo[a,d]cycloheptene and
5-(3-dimethylaminopropyl)-10,11-dihydro-5,10-methano-
  5H-dibenzo[a,d]cycloheptene.

The compounds of my invention are prepared by a reaction sequence illustrated in the following flow sheet:

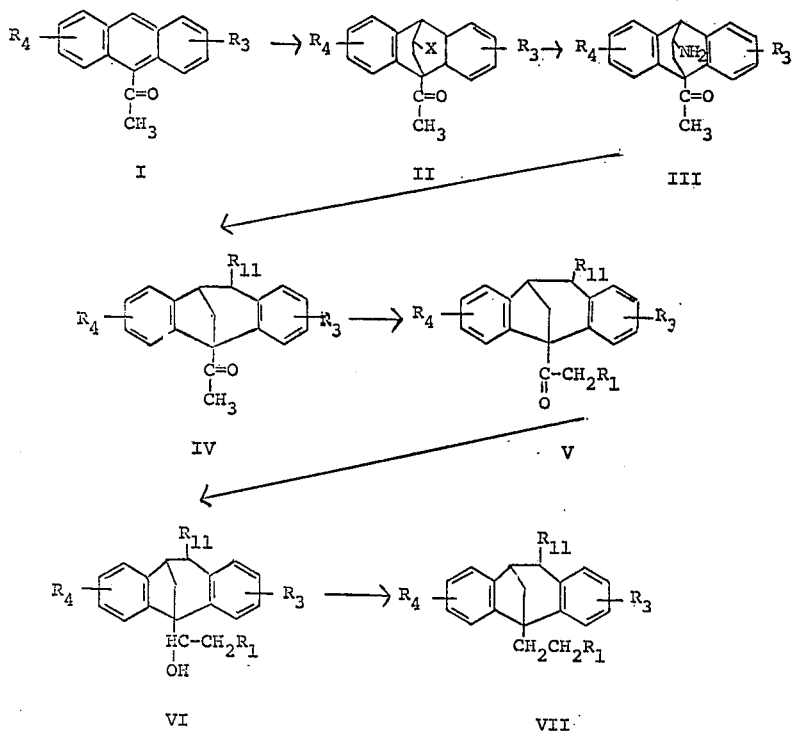

wherein X is carboxy or esterified carboxy such as COO lower alkyl, $R_3$ and $R_4$ are hydrogen, loweralkyl, loweralkoxy, halo, including fluoro, chloro, bromo and iodo, trifluoromethyl, alkylsulfonyl including dialkylsulfonyl, and alkylsulfamoyl including dialkylsulfamoyl; $R_{11}$ is hydroxyl, or alkanoyloxy and $R_1$ is alkyl or substituted alkyl including aminoalkyl, alkylaminoalkyl, dialkylaminoalkyl, or heterocyclicaminoalkyl in which the heterocyclic substituent is attached to the aliphatic side chain through the aminonitrogen atom which is included in a cycle of atoms of carbon, nitrogen or oxygen to form a ring of 5 or 6 atoms, including 1-piperidyl, 1-pyrrolidyl, 4-morpholinyl and 1-loweralkyl-4-piperizinyl, and in which the dotted line at the 5-position indicates that the compound may be saturated or unsaturated at the indicated side chain position ($C_1$, $C_2$).

In accordance with my invention, a 9-alkanoyl anthracene is heated with an unsaturated lower aliphatic acid such as acrylic acid or an ester thereof (Compound I hereinabove) to form the corresponding 9-alkanoyl-9,10-ethano-11-carboxy or carbalkoxydihydroantharacene, and subsequently converting said carboxy or carbalkoxy compound into the corresponding 11-carboxylic acid hydrazide by reaction, for example, of the 11-carboxylic acid ester with hydrazine to form the corresponding 11-carboxylic acid hydrazide, reacting said hydrazide with nitrous acid and hydrolyzing the resulting urethane under acidic conditions to the desired 9-alkanoyl-11-amino-9,10-ethano-9,10-dihydroanthracene (Compound III hereinabove).

The resulting 9-alkanoyl-11-amino-9,10-ethano - 9,10-dihydroanthracene is then heated in intimate contact with nitrous acid and an organic acid to form a 5-alkanoyl-10,11-dihydro-5,10-methano - 11 - hydroxy or acyloxy-5H - dibenzo-[a,d]cycloheptene (Compound IV hereinabove).

Compound IV is then heated under acidic conditions in the presence of an amine and an aldehyde, particularly formaldehyde, to introduce an aminoalkyl, preferably a dialkylaminomethyl substituent, into the alkanoyl side chain and form the desired 5-dialkylaminoalkanoyl-5,10-methano - 10,11 - dihydro-5H-dibenzo[a,d]cycloheptene (Compound V hereinabove).

The resulting alkylaminoalkanoyl compound is then reduced by heating in the presence of an alkali metal borohydride to produce the corresponding 5-alkylaminoalkanol-5,10-methano - 10,11 - dihydro-5H-dibenzo[a,d]cycloheptene (Compound VI illustrated hereinabove).

The formed aminoalkanol is then dehydrated by heating in the presence of an acidic dehydrating agent such as phosphorus oxychloride, whereby a double bond is introduced into the 5-position side chain of the compound and there is formed a 5-alkylaminoalkenyl-5,10-methano-10,11-dihydro-5H-dibenzo[a,d]cycloheptene represented by Formula VII hereinabove, in which the dotted line represents a compound containing a double bond at the indicated position. This compound is then catalytically hydrogenated to saturate the side chain double bond with resultant formation of a 5-alkylaminoalkyl-5,10-methano-10,11-dihydro-5H-dibenzo[a,d]cycloheptene (Compound VII hereinabove wherein the dotted line indicates that the 5-position side chain is saturated).

Thus, the process of my invention involves the conversion of a 9-alkanoylanthracene compound to produce a 5,10 - methano-10,11-dihydro - 5H - dibenzo[a,d]cycloheptene containing an alkylaminoalkyl substituent attached to the 5-position.

It is, of course, clear that many variations of the abovementioned process may be employed but, as such, they are presumed to be included within the scope of my invention. Thus, my process involves the addition of an unsaturated compound across the 9,10-position of the 9-alkanoylanthracene starting material, rearrangement of the resulting 9,10-ethano-9,10-dihydroanthracene under acidic conditions to produce the desired 5,10-methano-10,11-dihydro-5H-dibenzo[a,d]cycloheptene nucleus, and elaboration of the alkanoyl side chain at the 5-position of said 5,10-methano compound to produce a 5,10-methano-10,11-dihydro - 5H - dibenzo[a,d]cycloheptene having an alkylaminoalkyl side chain at the 5-position. The details of this process are set forth hereinbelow.

In converting 9-alkanoylanthracene, e.g., 9 - acetyl-9-propionyl-9-butyryl-9-valeryl or 9-hexanolyanthracene to the corresponding 9-alkanoyl-9,10-ethano-11-carboxy or carbalkoxy dihydroanthracene, the starting material is heated with acrylic acid or a derivative thereof as, for example, a loweralkyl ester, to produce the corresponding 9-alkanoyl-11-carboxy or carbalkoxy-9,10-ethanodihydroanthracene. In carrying out the reaction, it is preferable to heat a mixture of the reactants at the reflux temperature for a period of from a few minutes to 24 hours and, preferably, for a period of about 1 to 3 hours.

The reaction may be conducted in the presence of an inert high boiling solvent either as a liquid aromatic compound including phenol ethers, halogenated or nitro-substituted benzene, such as anisole, o-dichlorobenzene, nitrobenzene, and the like. However, it is preferred in the present instance to carry out the reaction by heating a mixture of the alkanoylanthracene and the acrylic acid or derivative thereof together for the recommended period of time using excess acrylic acid derivative as solvent medium. Acrylic acid derivatives which may be used as reactants in this addition reaction include methyl, ethyl, propyl, isopropyl, butyl, amyl and hexyl esters of acrylic acid. The product obtained in the case of the 11-carboxylic acid derivative is readily separated from the reaction mixture by dissolving in aqueous alkali and precipitation from acid, followed by recrystallization from mixtures of lower alkanols and water.

In carrying out the reaction with lower alkyl ester of acrylic acid, it is preferred to conduct the reaction in a dry, inert solvent in the presence of a small amount of an acidic catalyst such as the halide of aluminum, and heat the entire reaction mixture for a period of from about 2 to 50 hours and, preferably, for a period of from about 15 to 30 hours. Following reaction, the entire mixture is diluted with an aqueous acid and the solvent layer containing the formed product is separated, washed and dried. The product is obtained by crystallization from a concentrated solution.

The formed 9-alkanoyl-11-carboxy or carbalkoxy 9,10-ethanodihydroanthracene (Compound II hereinabove) is then converted to the corresponding 9-alkanoyl-11-amino-9,10-ethano-9,10-dihydroanthracene by, first, conversion to the acid azide and degradation to the amino compound. This is conveniently accomplished either by reaction of the free acid with hydrazoic acid, whereby the 11-amino compound is formed directly or by first converting the loweralkyl ester by reaction with hydrazine to the corresponding hydrazide. Reaction of the thus-formed hydrazide with nitrous acid results in production of the intermediate 11-urethane which is readily hydrolyzed under acidic conditions to the corresponding 11-amino-9,10-ethanodihydroanthracene.

In carrying out the conversion of the 11-carboxy or carbalkoxy-9-alkanoyl-9,10-dihydroanthracene to the corresponding 11-amino compound, it is preferred to first protect the 9-alkanoyl side chain as, for example, by formation of a ketal of the side chain substituent. This may be conveniently done by reaction of the 9-alkanoyl-11-carboxy or carbalkoxy-9,10-ethanoanthracene with a loweralkanol or a 1,2 or 1,3 loweralkylene glycol, such as ethylene glycol, 1,3-propylene glycol, or butane-diol (1,2 or 1,3) in the presence of an acid.

In the preferred instance, the 11-carboxy-9-alkanoyl-9,10-ethanodihydroanthracene or the corresponding ester thereof is heated in the presence of ethylene glycol admixed with a catalytic amount of an acid such as p-toluenesulfonic acid, to form the corresponding dioxolane of the side chain carbonyl substituent.

Conversion of the thus-formed alkyl-9,10-dihydro-9-(1-alkylenedioxyalkyl)-9,10-ethano-11-carboxy compound to the corresponding 11-carboxy ester is carried out in the same manner as previously described for the corresponding 9 - alkanoyl - 9,10 - ethano - 11-carboxy-9,10-dihydroanthracene compounds. The resulting esterified dioxolane derivative is then reacted with hydrazine to form the corresponding carboxylic acid hydrazide. The formed hydrazide is then heated with nitrous acid to form the 11-amino derivative. When the dioxolane derivative is used, rearrangement of the 11-carboxylic acid hydrazide to the 11-amino compound results in simultaneous hydrolysis of the dioxolane moiety and regeneration of the 9-alkanoyl side chain.

The resulting 9-alkanoyl-11-amino-9,10-ethanodihydroanthracene is then heated with nitrous acid to form 5-alkanoyl - 5,10 - methano - 11-hydroxy-5H-dibenzo[a,d] cycloheptene (Compound IV hereinabove).

When the reaction is carried out in a solvent which is unreactive with the formed product, the compound is readily isolated by evaporation of the solvent and separation of the product in crude form. In the event that the reaction is carried out in a loweralkanoic acid, the product obtained is the 11-acyloxy compound corresponding thereto wherein the 11-hydroxyl substituent is esterified by reaction with the reacting solvent alkanoic acid. In a preferred instance of the reaction, a 9-alkanoyl-11-amino-9,10-ethano-9,10-dihydroanthracene is heated in contact with nitrous acid in a solution of glacial acetic acid to form a mixture of products comprising principally the 11-acetoxy derivative of 5-alkanoyl-5,10-methano-5H-dibenzo[a,d]cycloheptene, along with a small amount of the corresponding 11-hydroxy derivative.

The resulting product, i.e., the 11-acyloxy or the 11-hydroxy compound (Compound IV hereinabove) is then heated under acidic conditions in the presence of an amine and an aldehyde in order to elaborate the side chain alkanoyl substituent and form a 5-dialkylaminoalkanoyl - 5,10 - methano - 10,11 - dihydro-5H-dibenzo[a,d]cycloheptene. This reaction is preferably carried out by reaction of formaldehyde and a secondary amine such as a dialkylamine or a heterocyclic amine wherein the amino nitrogen is included in the 5 or 6-membered heterocyclic ring comprising carbon, nitrogen and/or oxygen and sulfur, preferably a diloweralkylamine, with Compound IV hereinabove either present as the 11-acyloxy, the 11-hydroxy, or the corresponding compound containing only hydrogen as a substituent at the 11-position. The compound which is formed (indicated as Compound V hereinabove) is the corresponding 5-dialkylaminoalkanoyl-5,10-methano-5H-dibenzo[a,d]cycloheptene having an acyloxy, a hydroxy, or hydrogen substituent at the 11-position.

The reaction is preferably carried out by mixing the dialkylamine as the acid salt as, for example, a hydrochloride, with paraformaldehyde and an inert organic solvent, hydrocarbon solvents being preferred such as benzene, nitrobenzene, and the like. The entire reaction mixture is heated to from 50° C. to the reflux temperature of the reaction mixture for a period of from a few minutes to 24 hours, preferably for a period of time of about 15 minutes to 1 hour. Higher temperatures may be employed but they are impractical since the reaction goes essentially to completion in a short time at the reflux temperature of the mixture.

Following the reaction, during which the desired dialkylaminoalkanoyl-5,10-methanodibenzocycloheptene is formed, the water formed during the reaction is distilled as an azeotrope and the product precipitates as the acid salt which may be recovered by filtration. The resulting alkylaminoalkanoyl compound is then reduced by reaction with an alkali metal borohydride such as potassium or sodium borohydride, to the corresponding dialkylaminoalkanol-substituted compound (Compound VI hereinabove).

In the event the dialkylaminoalkanoyl compound submitted to this reduction procedure contains an acyloxy substituent at the 11-position in accordance with one of the preferred embodiments of my invention the acyloxy substituent is hydrolyzed during the course of the reduction reaction and the formed product is recovered as the 11-hydroxy derivative thereof. Thus, reaction of the corresponding 1 - (10,11-dihydro-5,10-methano-11-acetoxy - 5H - dibenzo - [a,d]cyclohepten-5-yl)-3-dimethylamino-1-propanone results in formation of 1-(10,11 - dihydro - 5,10-methano - 11-hydroxy-5H-dibenzo [a,d]cyclohepten-5-yl)-3-dimethylamino-1-propanol.

Similarly, reaction of 1 - (10,11-dihydro-5,10-methano-5H - dibenzo[a,d]cyclohepten - 5-yl)-3-dimethylamino-1-propanone with potassium borohydride results in the production of the corresponding 3-dimethylamino-1-propanol compound.

The reaction may be carried out from 0° C. to 100° C., although it is preferably carried out at from 15 to 30° C. under aqueous conditions. The starting 1-propanone compound, being only partyl soluble in water, is dissolved in a loweralkanol as, for example, methanol, ethanol, propanol, and the like, and is mixed with a solution of the alkali metal borohydride, e.g., sodium or potassium borohydride in water made slightly alkaline with sodium hydroxide.

The product of the reduction reaction is conveniently recovered as the acid salt thereof by removal of the solvent by distillation under reduced pressure and extraction of the residual reaction mixture with benzene. The acid salt as, for example, the fumarate, is then purified by recrystallization from a solution of a loweralkanol, e.g., ethanol. The product obtained in this manner may then be dehydrated by heating in the presence of an acidic dehydrating agent as, for example, phosphorus oxychloride and phosphorus pentoxide, and the like. The aminoalkanol (Compound VI hereinabove) in solution in benzene or chloroform or other inert solvents, is mixed with an excess amount of phosphorus oxychloride and heated to the reflux temperature of the solvent for a period of from 1 to 30 hours at reflux temperature.

The product obtained as a result of the dehydration reaction is the desired 5-dialkylaminoalkenyl-5,10-methano-5H-dibenzo[a,d]cycloheptene (Compound VII hereinabove) mixed with the corresponding 5(1-chloro-3-dialkylamino) compound wherein the dotted line of the formula represents a double bond in the indicated position of the side chain. The unsaturated product and (or the halo-substituted product) obtained in this manner is then catalytically reduced to saturate the side chain and produce the corresponding 5-alkylaminoalkyl-5,10 - methano - 10,11-dihydro-5H-dibenzo[a,d]cycloheptene.

The compounds of my invention can advantageously be employed in pharmaceutical applications because they have been found to possess antidepressant activity. As antidepressants, they may be administered orally in the form of tablets, powders, sustained release pellets and the like or they may be administered orally or parenterally in the form of aqueous solutions or suspensions. When administered orally or parenterally, satisfactory results are obtained at a daily dosage level of from about 1 mg. to about 300 mgs. preferably given in divided doses over the day or in sustained release form. The compounds are preferably administered in the form of their non-toxic acid addition salts and these salts are included within the scope of this invention. In addition, the 5,10-methanodibenzocycloheptene compounds represented by Formulas VI and VII may be converted to the N oxides. These compounds, as well as their acid addition salts, possess antidepressant activity and are also included within the scope of my invention.

The following examples are presented to illustrate the methods of carrying out the present invention.

EXAMPLE 1

9-acetyl-9,10-dihydro-9,10-ethanoanthracene-11-carboxylic acid

A solution of 9 - acetylanthracene (11.6 g., 0.0525 mole) in 30 ml. of acrylic acid (stabilized with p-methoxyphenol) is heated to refluxing for 2½ hours. The cooled, viscous mixture is dissolved in 20% aqueous sodium hydroxide while cooling in an ice bath. The resulting solution is added to an excess of ice-cold 6 N hydrochloric acid and the gummy precipitate collected, washed with water, and crystallized from a mixture of ethanol and water with decolorization with decolorizing carbon. The white crystalline 9-acetyl-9,10-dihydro-9,10-ethanoanthracene-11-carboxylic acid, M.P. 169–171° C. dec., when recrystallized from ethanol-water, gives product, M.P. 172–174° C. dec. A purified sample melts at 172.5–174.5° dec.

*Analysis.*—Calcd. for $C_{19}H_{16}O_3$ (percent): C, 78.06; H, 5.52. Found (percent): C, 77.94; H, 5.50.

EXAMPLE 2

9,10-dihydro-9-(2-methyl-1,3-dioxolan-2-yl)-9,10-ethanoanthracene-11-carboxylic acid 9 - acetyl - 9,10 - dihydro-9,10-ethanoanthracene-11-carboxylic acid (2.5 g., 0.00855 mole), p-toluene sulfonic acid monohydrate (100 mg.), ethylene glycol (8 ml.) and dry toluene (75 ml.) are mixed and heated to refluxing under a Dean-Stark water separator for 12 hours. Solvent is evaporated under reduced pressure. The residual oil containing the product is dissolved in 10 ml. of 95% ethanol and heated to refluxing with 10 ml. of 10% aqueous sodium hydroxide for 1½ hours. Ethanol is distilled under reduced pressure and the residual alkaline solution diluted with water and added to an excess of ice-cold 6 N hydrochloric acid. The precipitate is collected, washed with water, and crystallized from 50% ethanol, M.P. 239–246° C. A purified sample melts at 250–252° C. after repeated recrystallizations from 50% alcohol.

*Analysis.*—Calcd. for $C_{21}H_{20}O_4$ (percent): C, 74.99; H, 5.99. Found (percent): C, 74.62; H, 5.99.

EXAMPLE 3

Methyl-9,10-dihydro-9-(2-methyl-1,3-dioxolan-2-yl)-9,10-ethanoanthracene-11-carboxylate A dry ethereal solution (50 ml.) containing about 1.4 g. (0.033 mole) of diazomethane is added to a stirred suspension of 9,10-dihydro-9-(2-methyl-1,3 - dioxolan-2-yl)-9,10-ethanoanthracene-11-carboxylic acid (1.95 g., 0.0058 mole) in 50 ml. of absolute ether cooled in an ice bath. The ice bath then is removed and the mixture stirred at room temperature overnight. Solvent is evaporated at room temperature and under reduced pressure and the residue dissolved in absolute ether. After filtration from a small amount of insoluble material, the solution is evaporated and the residual colorless glass containing the product crystallized from a mixture of ethanol and water, M.P. 128–131° C. Repeated recrystallizations from 60% ethanol give a purified product, M.P. 128–130° C.

*Analysis.*—Calcd. for $C_{22}H_{22}O_4$ (percent): C, 75.41; H, 6.33. Found (percent): C, 75.39; H, 6.23.

EXAMPLE 4

Methyl-9-acetyl-9,10-dihydro-9,10-ethanoanthracene-11-carboxylate

A solution of 9-acetyl-9,10-dihydro-9,10-ethanoanthracene-11-carboxylic acid (2.92 g., 0.01 mole) and p-toluenesulfonic acid monohydrate (100 mg.) in 60 ml. of absolute methanol is heated to refluxing for 3½ hours. Solvent is evaporated under reduced pressure and the residual oil dissolved in benzene (30 ml.). After washing with 5% aqueous sodium hydroxide and water and drying by filtration through anhydrous magnesium sulfate, the benzene is evaporated under reduced pressure. The residue consists of the crystalline product, M.P. 90–94° C. A purified sample melts at 95–97° C., after repeated recrystallizations from ether-petroleum ether.

*Analysis.*—Calcd. for $C_{20}H_{18}O_3$ (percent): C, 78.41; H, 5.92. Found percent: C, 78.93; H, 5.81.

EXAMPLE 5

Methyl-9-acetyl-9,10-dihydro-9,10-ethanoanthracene-11-carboxylate

A solution of methyl acrylate (34.4 g., 0.4 mole, freshly redistilled under nitrogen, B.P. 78.5–79.5° C.) in 40 ml. of dry benzene is added dropwise over a 10 minute period to a stirred suspension of anhydrous aluminum chloride (5.33 g., 0.04 mole) in 180 ml. of dry benzene warmed to about 50° C. The clear solution is stirred and maintained at about 50° C. while a solution of 9-acetyl-anthracene 44 g., 0.2 mole) in 50 ml. of dry benzene is added. The mixture is stirred and heated in a slow stream of nitrogen at 60–65° C. for 21 hours. After cooling the mixture in an ice-bath, 100 ml. of 6 N hydrochloric acid is added. The benzene layer is separated, re-extracted with 100 ml. 6 N hydrochloric acid, washed with three 100 ml. portions of water, and dried over anhydrous sodium sulfate. Evaporation of the benzene under reduced pressure and crystallization of the oily residue from a mixture of hexane and benzene affords the product, M.P. 101–103° C. This product gives no depression in melting point on admixture with an authentic sample of methyl-9-acetyl-9,10 - dihydro-9,10-ethanoanthracene-11-carboxylate prepared by the procedure described in Example 4.

EXAMPLE 6

Methyl-9,10-dihydro-9-(2-methyl-1,3-dioxolan-2-yl)-9,10-ethanoanthracene-11-carboxylate Methyl - 9-acetyl - 9,10-dihydro-9,10-ethanoanthracene-11-carboxylate (46 g., 0.15 mole), p-toluenesulfonic acid monohydrate (500 mg.), ethylene glycol (46 ml.) and dry benzene (550 ml.) are mixed and heated to refluxing under a Dean-Stark water separator for 8 hours. The mixture is transferred to a separatory funnel, the lower ethylene glycol phase removed, and the benzene phase washed with several 50 ml. portions of water. After drying by filtration through anhydrous sodium sulfate, the benzene is evaporated under reduced pressure and the residual oil comprising the product crystallized from 30 ml. of 95% ethanol, M.P. 127–130°. Recrystallization from 95% ethanol gives product with M.P. 128.5–130.5°.

EXAMPLE 7

9,10-dihydro-9-(2-methyl-1,3-dioxolan-2-yl)-9,10-ethanoanthracene-11-carboxylic acid hydrazide Methyl-9-acetyl-9,10-dihydro-9-(2-methyl-1,3-dioxolan-2-yl) - 9,10 - ethanoanthracene - 11 - carboxylate (1.5 g., 0.0043 mole) is suspended in 7 ml. of hydrazine hydrate and the mixture is heated to refluxing for 15 minutes. Sufficient ethanol (5 ml.) is added to dissolve the suspended oil and the solution is heated to refluxing for 3 hours. During this period, white crystals separate and after cooling, the precipitate is collected and washed with 50% ethanol, M.P. 253–254° C. Repeated recrystallizations from absolute ethanol give an analytical sample, M.P. 254–255° C.

*Analysis.*—Calcd. for $C_{21}H_{22}N_2O_3$ (percent): C, 72.26; H, 6.06; N, 8.03. Found (percent): C, 71.97; H, 6.27, N, 8.04.

EXAMPLE 8

9,10-dihydro-11-ethoxycarbonylamino-9-(2-methyl-1,3-dioxolan-2-yl)-9,10-ethanoanthracene A suspension of 9,10-dihydro-9-(2-methyl-1,3-dioxolan-2-yl)-9,10-ethanoanthracene-11-carboxylic acid hydrazide (4.8 g., 0.0138 mole) in 190 ml. of acetone is stirred and cooled to 0° C. in an ice-salt bath. The solid is dissolved by the addition of 9 ml. of 6 N hydrochloric acid. A solution of sodium nitrite (965 mg., 0.014 mole) in 6 ml. of water is added dropwise and stirring at −5° to 0° C. is continued for 30 minutes. After the addition of 190 ml. of absolute ethanol and a 15 minute period of stirring at 0° C. the mixture is filtered. The filtrate is stirred with anhydrous sodium sulfate at 0° C. for 2 hours. After filtration, acetone is removed from the filtrate by the distillation of about 260 ml. of solvent, B.P. 60–74° C. Ethanol, 200 ml., is added and the solution is heated to refluxing for 16 hours. Solvent is evaporated under reduced pressure and the residue dissolved in 75 ml. of benzene, filtering from insoluble material. Distillation of the benzene under reduced pressure and crystallization of the residual solid from a mixture of ethanol and water gives the product, M.P. 165–167° C., in a yield of 2.6 g. (56%). A sample for analysis melts at 167.5–169.5° C. after repeated recrystallizations from ethanol-water mixtures.

*Analysis.*—Calcd. for $C_{21}H_{21}NO_3$ (percent): C, 75.20; H, 6.31; N, 4.18. Found (percent): C, 75.12; H, 6.26; N, 3.98.

EXAMPLE 9

9-acetyl-11-amino-9,10-dihydro-9,10-ethanoanthracene 9,10 - dihydro - 11-ethoxycarbonylamino-9-(2-methyl-1,3-dioxolan-2-yl)-9,10-ethanoanthracene (2.6 g., 0.00775 mole) together with 30 ml. of glacial acetic acid, 15 ml. of concentrated hydrochloric acid, and 15 ml. of water are heated to refluxing for 40 hours. Distillation of the solvents under reduced pressure and crystallization of the residual solid from an absolute ethanol-ether mixture yields 9 - acetyl - 11-amino-9,10-dihydro-9,10-ethanoanthracene hydrochloride, M.P. 288–290° C. dec. An analytical sample melts at 288–289° C. dec. after repeated recrystallizations from absolute ethanol and from isopropyl alcohol.

*Analysis.*—Calc'd for $C_{18}H_{17}NO \cdot HCl$ (percent): C, 72.09; H, 6.05; N, 4.67. Found (percent): C, 72.21; H, 6.06; N, 4.64.

EXAMPLE 10

11 - acetoxy - 5-acetyl-10,11-dihydro-5,10-methano-5H-dibenzo[a,d]cycloheptene and 5-acetyl-10,11-dihydro-5,10-methano-5H-dibenzo[a,d]cyclohepten-11-ol 9 - acetyl-11-amino-9,10-dihydro-9,10-ethanoanthracene hydrochloride (4.2 g.; 0.014 mole) is suspended in 40 ml. of glacial acetic acid and stirred while sodium nitrite (3.9 g., 0.056 mole) is added in portions over 10–15 minutes. The temperature rises spontaneously to about 42° C. and gas evolution is vigorous. After stirring for 22 hours at room temperature, the reaction mixture containing the product is filtered, washing the precipitate with glacial acetic acid. Distillation of the acetic acid from the filtrate under reduced pressure leaves a viscous oil containing a mixture of 11 - acetoxy - 5 - acetyl - 10,11 - dihydro - 5,10-methano-5H-dibenzo[a,d]cycloheptene and 5-acetyl-10,11-dihydro - 5,10 - methano-5H-dibenzo[a,d]cyclohepten-11-ol that solidifies on trituration with cold methanol. The precipitate is collected and recrystallized from methanol, M.P. 141–144° C. Repeated recrystallization of the product from methanol gives 11-acetoxy-5-acetyl-10,11-dihydro-5,10-methano - 5H-dibenzo[a,d]cycloheptene melting at 142–144° C.

*Analysis.*—Calcd. for $C_{20}H_{18}O_3$ (percent): C, 78.41; H, 5.92. Found (percent): C, 78.48; H, 6.00.

The methanol filtrate from the precipitation of 11-acetoxy - 5 - acetyl - 10,11-dihydro-5,10-methano-5H-dibenzo[a,d]cycloheptene is evaporated. The residual oily solid is freed from oil by pressing out on a porous plate yielding 5 - acetyl - 10,11-dihydro-5,10-methano-5H-dibenzo[a,d]cyclohepten-11-ol), M.P. 136–163° C. A typical sample melts at 178.5–179.5° C. after successive recrystallizations from ethanol-water, isopropyl alcohol-water and absolute ether.

*Analysis.*—Calcd. for $C_{18}H_{16}O_2$ (percent): C, 81.79; H, 6.10. Found (percent): C, 81.82; H, 6.09.

EXAMPLE 11

5-acetyl-10,11-dihydro-5,10-methano-5H-dibenzo[a,d]cyclohepten-11-ol

11 - acetoxy - 5 - acetyl-10,11-dihydro-5,10-methano-5H-dibenzo[a,d]cycloheptene (1.8 g.) is dissolved in 30 ml. of 5% potassium hydroxide in 95% ethanol and the solution is heated to refluxing for 1½ hours. Evaporation of the ethanol under reduced pressure and trituration of the residue with water gives the solid product which is collected, dried, and recrystallized from ether to obtain substantially pure product, M.P. 167–177°. Recrystallization from ether gives product, M.P. 174–177°.

EXAMPLE 12

1 - (11 - acetoxy-10,11-dihydro-5,10-methano-5H-dibenzo[a,d] - cyclohepten - 5 - yl)-3-dimethylamino-1-propanone hydrochloride A mixture of dimethylamine hydrochloride (165 mg., 0.00202 mole), paraformaldehyde (70 mg., 0.00233 mole) and concentrated hydrochloric acid (1 drop) is stirred and heated to refluxing in 1 ml. of nitrobenzene and 1 ml. of benzene for 20 minutes. During this period, the solids first form a ball and then a colorless, lower second phase. 11-acetoxy - 5 - acetyl-5,10-methano-5H-dibenzo[a,d]cycloheptene (610 mg., 0.002 mole) is added and the mixture is stirred at reflux for 2 hours. During the last 5 minutes of this period, the condenser is removed so that water in the mixture may distill azeotropically. After cooling to room temperature and filtration from a small quantity of precipitate, the filtrate is diluted with ether. The product precipitates and is collected, washed with ether, dried, and crystallized from isopropyl alcohol-ether, M.P. 181–183° C. dec. Repeated recrystallizations from isopropyl alcohol-ether give a purified product, M.P. 186–187° C. dec.

*Analysis.*—Calc'd. for $C_{23}H_{25}NO_3 \cdot HCl$ (percent): C, 69.07; H, 6.55; N, 3.50. Found (percent) C, 68.85; H, 6.71; N, 3.37.

EXAMPLE 13

1 - (10,11 - dihydro-11-hydroxy-5,10-methano-5H-dibenzo[a,d]-cyclohepten-5-yl)-3-dimethylamino-1-propanol 1 - (11 - acetoxy-10,11-dihydro-5,10-methano-5H-dibenzo[a,d]cyclohepten-5-yl)3-dimethylamino - 1 - propanone is prepared from 4.22 g. (0.0105 mole) of the hydrochloride salt by rendering an aqueous solution of the salt strongly alkaline with 5% sodium hydroxide and extracting the oily base into benzene. Evaporation of the washed and dried benzene extract under reduced pressure leaves the oily residue which is dissolved in 250 ml. of methanol. A solution of potassium borohydride (1.13 g., 0.021 mole) in 6 ml. of water containing 2 drops of 10 N sodium hydroxide is added. After stirring for 6 hours and standing for 2 days at room temperature, methanol is distilled under reduced pressure. The residue is partitioned between benzene and water and the benzene extract is separated, washed, dried, and evaporated to dryness under reduced pressure. The product remains as the residual glass in quantitative yield. The base is converted to the hydrogen oxalate salt by treating an ethanolic solution with an equimolar amount of oxalic acid dissolved in ethanol. The 1-(10.11-dihydro-11-hydroxy-5,10-methano-5H - dibenzo[a,d] - cyclohepten-5-yl)-3-dimethylamino-1-propanol hydrogen oxalate precipitates, M.P. 195–197° C. A purified sample melts at 199–200° C. after repeated recrystallizations from mixtures of absolute ethanol and methanol.

*Analysis.*—Calcd. for $C_{21}H_{25}NO_2 \cdot C_2H_2O_4$ (percent): C, 66.81; H, 6.58; N, 3.39. Found (percent): C, 66.55; H, 6.52; N, 3.51.

EXAMPLE 14

1-(11-chloro-10,11-dihydro - 5,10 - methano-5H-dibenzo-[a,d]cyclohepten-5-yl) - 3 - dimethylamino-1-propanol hydrochloride 1-(10,11-dihydro - 11 - hydroxy-5,10-methano-5H-dibenzo[a,d]cyclohepten-5-yl) - 3 - dimethylamino-1-propanol (0.75 g.; 0.00232 mole) is added in portions to 2.5 ml. of thionyl chloride with stirring and cooling in the ice bath. After 3½ hours of stirring at room temperature, the excess thionyl chloride is distilled under reduced pressure and at room temperature. The residual glass is dissolved in absolute ethanol and the solution evaporated under reduced pressure. Addition and removal of ethanol is repeated and, finally, the residue is triturated with 3 ml. of acetone. The white crystalline hydrochloride of the product is collected, washed with ether and dried in vacuo, M.P. 182–190° C. dec. A purified sample melts at 192–194° C. dec. after recrystallization from acetone.

*Analysis.*—Calcd. for $C_{21}H_{24}ClNO \cdot HCl$ (percent): C, 66.68; H, 6.66; Cl, 18.74. Found (percent): C, 66.64; H, 6.65; Cl, 18.6.

EXAMPLE 15

1-(10,11-dihydro - 5,10 - methano-5H-dibenzo[a,d]cyclohepten-5-yl)-3-dimethylamino-1-propanol A dry, nitrogen-flushed flask is charged with 1-(11-chloro-10,11-dihydro - 5,10 - methano - 5H - dibenzo[a,d]cyclohepten-5-yl) - 3 - dimethylamino-1-propanol hydrochloride (0.855 g., 0.00225 mole), tert-butyl alcohol (3.35 g., 0.045 mole) and 20 ml. of dry tetrahydrofuran. Under a slow stream of nitrogen, the suspension is stirred vigorously and freshly-cut small pieces of sodium (1.35 g.; 0.0575 g. atom) are added. The mixture is stirred and heated to refluxing for 6 hours. Excess sodium is destroyed by the slow addition of 10 ml. of absolute methanol. After cooling, the mixture is poured into 250 ml. of ice water and the oily base is extracted into 1:1 benzene-ether. Solvents are distilled from the washed and dried organic extract under reduced pressure, leaving the oily product as the residue.

The base (0.6 g., 0.00196 mole) is converted to the fumarate salt by treating an ethanolic solution with an equimolar amount of fumaric acid dissolved in ethanol. The 1-(10,11-dihydro - 5,10 - methano-5H-dibenzo[a,d]cyclohepten - 5 - yl) - 3-dimethylamino-1-propanol fumarate precipitates, M.P. 231–233° C. dec. An analytical sample melts at 232–233° C. dec. after decrystallization from absolute ethanol.

Analysis.—Calcd. for $C_{23}H_{27}NO_3 \cdot \frac{1}{2}C_4H_4O_4$ (percent): C, 75.59; H, 7.45; N, 3.83. Found (percent): C, 75.28; H, 7.38; N, 3.76.

EXAMPLE 16

1-(10,11-dihydro - 5,10 - methano-5H-dibenzo[a,d]cyclohepten-5-yl)-3-dimethylamino-1-propanol With a stream of nitrogen passing through the solution, 55% hydriodic acid, 0.2 ml., is heated on the steam bath and decolorized by the addition of 1 drop of 50% hypophosphorus acid. Red phosphorus (25 mg., 0.0008 g. atom), 1-(10,11-dihydro - 11 - hydroxy-5,10-methano-5H-dibenzo[a,d]cyclohepten-5-yl) - 3 - dimethylamino-1-propanol (66 mg.; 0.000204 mole), and 1 ml. of glacial acetic acid are added. The mixture is stirred at reflux for 4 hours. Phosphorus is removed by filtration and washed with glacial acetic acid. The ice-cold filtrate is rendered strongly alkaline and the oily base that separates is extracted into benzene. Evaporation of the washed and dried benzene extract under reduced pressure leaves an oil. This residue is heated to refluxing for 1½ hours in 1 ml. of 5% potassium hydroxide in 95% ethanol. The solvent is evaporated under reduced pressure and the residue partitioned between ether and water. The etheral layer is separated, washed with water, dried by filtration through anhydrous magnesium sulfate, and evaporated under reduced pressure. The residual oily base, 44 mg. (70%), is identical in infrared and proton magnetic resonance spectra to the compound prepared according to the previous example. Upon treatment with fumaric acid, the product is converted to the fumarate salt, M.P. 231–232° C. dec., that gives no depression in melting point on admixture with the fumarate of the compound prepared according to the previous example.

EXAMPLE 17

5-acetyl-11-chloro - 10,11 - dihydro 5,10-methano-5H-dibenzo[a,d]cycloheptene 5-acetyl-10,11-dihydro - 5,10 - methano - 5H - dibenzo[a,d]cyclohepten-11-ol (1.32 g., 0.005 mole) is added in portions to 5 ml. of thionyl chloride with stirring and cooling in an ice bath. After 4½ hours of stirring at room temperature, the excess thionyl chloride is distilled under reduced pressure and at room temperature. The residual solid is suspended in absolute ethanol and the mixture evaporated under reduced pressure. Crystallization of the residue from 95% ethanol affords the product, M.P. 126–130° C. A purified sample melts at 128.5–130.5° C. after repeated recrystallizations from 95% ethanol.

Analysis.—Calcd. for $C_{18}H_{15}ClO$ (percent): C, 76.45; H, 5.35; Cl, 12.54. Found (percent): C, 76.23; H, 5.44; Cl, 12.52.

EXAMPLE 18

5-acetyl-10,11-dihydro - 5,10 - methano-5H-dibenzo[a,d]cycloheptene

A solution of 5-acetyl-11-chloro - 10,11 - dihydro-5,10-methano-5H-dibenzo[a,d]cycloheptene (0.84 g., 0.00308 mole) in 0.5 ml. triethylamine—35 ml. absolute ethanol is hydrogenated at room temperature and atmospheric pressure in the presence of 70 mg. of 5% palladium on charcoal. When one equivalent of hydrogen is taken up, the reduction stops and catalyst is removed by filtration and washed with absolute ethanol. The filtrate is evaporated under reduced pressure and the residue triturated with absolute ether. The precipitate of triethylamine hydrochloride is removed by filtration, the filtrate evaporated and the residual solid crystallized from 95% ethanol, M.P. 105–107° C. A purified sample melts at 106–107° C. after recrystallization from 70% ethanol and sublimation at 80° and 0.05 mm.

Analysis.—Calcd. for $C_{18}H_{16}O$ (percent): C, 87.06; H, 6.50. Found (percent): C, 87.00; H, 6.38.

EXAMPLE 19

1-(10,11-dihydro-5,10-methano-5H-dibenzo[a,d]cyclohepten-5-yl)-3-dimethylamino-1-propanone A mixture of dimethylamine hydrochloride (265 mg., 0.00324 mole) paraformaldehyde (112 mg., 0.00372 mole) and concentrated hydrochloric acid (2 drops) is stirred and heated to refluxing in 1.6 ml. of nitrobenzene and 1.6 ml. of benzene for 20 minutes. During this period, the solids first form a ball and then a colorless, lower second phase. 5-acetyl-10,11-dihydro-5,10-methano-5H-dibenzo[a,d]cycloheptene (797 mg., 0.0032 mole) is added and the mixture is stirred at reflux for 2½ hours. During the final 15 minutes of this period, the condenser is removed so that water in the mixture may distill azeotropically. On cooling, the hydrochloride of the product precipitates and is collected, washed with ether, and triturated with boiling isopropyl alcohol, M.P. 210–212° C. Recrystallization from mixtures of absolute ethanol and absolute ether affords an analytical sample, M.P. 211–213° C.

Analysis.—Calcd. for $C_{21}H_{23}NO \cdot HCl$ (percent): C, 73.77; H, 7.07; N, 4.10. Found (percent): C, 73.57; H, 6.94; N, 4.03.

EXAMPLE 20

1-(10,11-dihydro-5,10-methano-5H-dibenzo[a,d]cyclohepten-5-yl)-3-dimethylamino-1-propanol 1-(10,11 - dihydro - 5,10 - methano-5H-dibenzo[a,d]-cyclohepten - 5 - yl) - 3-dimethylamino-1-propanone (376 mg., 0.00123 mole) is dissolved in 15 ml. of absolute methanol. A solution of potassium borohydride (135 mg., 0.0025 mole) in 1 ml. of water containing 1 drop of 5% aqueous sodium hydroxide is added and the mixture, after stirring at room temperature for 3 hours, is maintained at 0–5° C. for 2 days. Methanol is distilled under reduced pressure and the residue partitioned between benzene and water. Evaporation of the washed and dried benzene extract leaves the oily product in a yield of 317 mg. The base is converted to the fumarate salt by treating an ethanolic solution with an equimolar amount of fumaric acid dissolved in ethanol. 1-(10,11-dihydro-5,10-methano - 5H - dibenzo[a,d]cycloheptene-5-yl) - 3-dimethylamino-1-propanol fumarate crystallizes, M.P. 228–230° C. and gives no depression in melting point on admixture with the product prepared according to the previous example.

EXAMPLE 21

10,11 - dihydro - 5 - (1 - chloro-3-dimethylaminopropyl)-5,10 - methano - 5H - dibenzo[a,d]cycloheptene and 1 - (10,11 - dihydro - 5,10 - methano-5H-dibenzo[a,d]cycloheptene-5-yl)-3-dimethylamino-1-propene 1 - (10,11 - dihydro - 5,10 - methano - 5H - dibenzo[a,d]cyclohepten-5-yl)-3-dimethylamino-1 - propanol, 399 mg. (0.0013 mole), is converted to the hydrochloride salt by treatment of a benzene solution with an excess amount of ethanolic hydrogen chloride. Evaporation of the solution under reduced pressure leaves the white solid hydrochloride which is dried in vacuo at 70° C. A suspension of the hydrochloride in 2 ml. of chloroform and 0.5 ml. of phosphorus oxychloride is stirred at reflux for 30 hours. A clear solution is obtained after 2–3 hours. After cooling and dilution with chloroform, the mixture is extracted with ice-water. The chloroform layer is separated and evaporated to dryness leaving an oily residue which is triturated with cold dilute hydrochloric acid and filtered. The aqueous extracts are combined, rendered strongly alkaline with 5% aqueous sodium hydroxide, and the oily base extracted into 1:1 benzene: ether. Evaporation of the washed and dried organic extract under reduced pressure leaves a viscous oil containing a mixture of 10,11 - dihydro-5-(1 - chloro-3-dimethylaminopropyl) - 5,10 - methano - 5H - dibenzo[a,d] cycloheptene and 1-(10,11-dihydro-5,10-methano-5H-dibenzo[a,d]cyclohepten - 5 - yl) - 3 - dimethylamino-1-propene. The hydrogen oxalate salt of this product is obtained by treating an ethereal solution of the base with a small excess of oxalic acid dissolved in absolute ethanol, M.P. 168–171° C. dec. A purified sample melts at 176–178° C. dec. after recrystallization from ethanol-ether.

*Analysis.*—Calcd. for 60% $C_{21}H_{24}ClN \cdot C_2H_2O_4$: 40% $C_{21}H_{23}N \cdot C_2H_2O_4$: C, 68.98; H, 6.44; Cl, 5.12. Found: C, 68.72; H, 6.39; Cl, 4.92.

EXAMPLE 22

5-(3-dimethylaminopropyl)-10,11-dihydro-5,10-methano-5H-dibenzo[a,d]cycloheptene A suspension of platinum oxide (30 mg. in 3 ml. of absolute alcohol is prereduced by shaking with hydrogen in a Hershberg apparatus. A solution of 100 mg. of 1-(10,11 - dihydro - 5,10-methano-5H-dibenzo[a,d]cyclohepten-5-yl)-3-dimethylamino-1-propene in 50 ml. of absolute alcohol is added to the prereduced suspension of platinum oxide and the entire mixture shaken in contact with hydrogen under a pressure of approximately 100 pounds per square inch until one molar equivalent of hydrogen is absorbed. The product, which is contained in the hydrogenation mixture, is separated from the catalyst by filtration of the catalyst and careful washing of the catalyst with hot ethanol. The filtrate containing the desired product is combined with the washings and the resulting ethanol solution of product is evaporated under reduced pressure to produce a residual oil comprising the product. Purification of the product is accomplished by recrystallization from a mixture of isopropyl alcohol and water.

The product may alternatively be obtained by hydrogenation of an ethanol solution of the product mixture obtained in the previous example. Hydrogenation is carried out under pressure and in the presence of 5% palladium on charcoal catalyst. The product obtained in this manner is similarly separated from the catalyst and recrystallized from a mixture of isopropyl alcohol and water.

What is claimed is:
1. A compound having the structural formula:

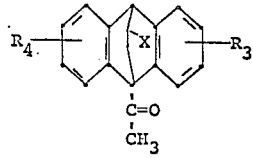

wherein $R_3$ and $R_4$ are hydrogen, halo, lower alkyl, lower alkoxy or trifluoromethyl and X is —$NH_2$, —COOH or —COO lower alkyl.

2. A compound in accordance with claim 1 consisting of 9 - acetyl - 9,10 - dihydro - 9,10 - ethanoanthracene-11-carboxylic acid.

3. A compound in accordance with claim 1 consisting of methyl - 9 - acetyl - 9,10 - dihydro - 9,10 - ethanoanthracene-11-carboxylate.

References Cited

Vaughan et al., Journal American Chemical Society, vol. 80, 1958, pp. 1956–1963.

ALEX MAZEL, Primary Examiner

J. H. TURNIPSEED, Assistant Examiner

U.S. Cl. X.R.

260—247, 247.1, 247.5, 247.7, 268, 293.4, 294.7, 326.81, 340.7, 340.9, 456, 470, 473, 476, 482, 483, 484, 488, 515, 520, 545, 556, 566, 570.5, 570.8, 571, 576, 578, 592, 611, 618; 424—246, 248, 250, 263, 267, 274, 278, 299, 303, 309, 321, 324, 325, 327, 330, 331

UNITED STATES PATENT OFFICE
CERTIFICATE OF CORRECTION

Patent No. 3,505,388          Dated April 7, 1970

Inventor(s) Marcia E. Christy

It is certified that error appears in the above-identified patent and that said Letters Patent are hereby corrected as shown below:

Column 3, line 47, the word "sulphonyl" should read "sulfonyl". Column 6, line 72, the word "carbalkoxy-dihydroantharacene" should read "carbalkoxydihydro-anthracene". Column 7, line 59, the word "hexanoly-anthracene" should read "hexanoylanthracene". Column 9, line 72, the word "partyl" should read "partly". Column 14, line 42, "(10.11-...)" should read "(10,11-...)"; line 71, "18.6" should read "18.66". Column 15, line 22, the word "decrystallization" should read "recrystallization"; line 46, the word "etheral" should read "ethereal".

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents